United States Patent
Choi

(10) Patent No.: US 8,493,909 B2
(45) Date of Patent: *Jul. 23, 2013

(54) METHOD FOR THE TRANSMISSION OF DATA FIELD OF TECHNOLOGY

(75) Inventor: Hyung-Nam Choi, Hamburg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,256

(22) Filed: Oct. 14, 2011

(65) Prior Publication Data

US 2012/0026921 A1  Feb. 2, 2012

Related U.S. Application Data

(63) Continuation of application No. 10/595,245, filed as application No. PCT/EP2004/051958 on Aug. 30, 2004, now Pat. No. 8,040,833.

(30) Foreign Application Priority Data

Sep. 29, 2003  (DE) .................................. 103 45 220

(51) Int. Cl.
*H04Q 7/00*  (2006.01)

(52) U.S. Cl.
USPC ........... 370/322; 370/329; 370/342; 370/338; 370/335; 370/441; 370/350; 370/328; 370/479

(58) Field of Classification Search
None
See application file for complete search history.

(56) References Cited

U.S. PATENT DOCUMENTS

| | | | |
|---|---|---|---|
| 7,359,345 B2 * | 4/2008 | Chang et al. | 370/322 |
| 8,089,879 B2 * | 1/2012 | Hu et al. | 370/235 |
| 2004/0228313 A1 | 11/2004 | Cheng et al. | |
| 2009/0274086 A1 * | 11/2009 | Petrovic et al. | 370/312 |

FOREIGN PATENT DOCUMENTS

| | | |
|---|---|---|
| CN | 1402566 A | 3/2003 |
| EP | 0993137 A1 | 4/2000 |
| EP | 993137 A1 * | 4/2000 |
| WO | 2004073273 A1 | 8/2004 |

OTHER PUBLICATIONS

3GPP TS 25.321 Version 5.6.0.*
3GPP TS 25.321 V5.6.0 (Sep. 2003) 3rd Generation Partnership Project; Technical Specification Group Radio Access Network; Medium Access Control (MAC) protocol specification Release 5; pp. 1-55.
3GPP TS 25.321 V5.5.0 (Jun. 2003) 3rd Generation Partnership Project; Technical Specification Group Radio Access Network; Medium Access Control (MAC) protocol specification Release 5; pp. 1-54.
English abstract of CN 1402566 A (Mar. 12, 2003).
3GPP TS 36.321 V9.3.0, 3rd Generation Partnership Project; Technical Specification Group Radio Access Network; Evolved Universal Terrestrial Radio Access (E-UTRA); Medium Access Control (MAC) protocol specification (Release 9), Jun. 2010, pp. 1-48.

* cited by examiner

*Primary Examiner* — Olumide T Ajibade Akonai
*Assistant Examiner* — Randy Peaches

(57) ABSTRACT

A method, system and computer program product for the transmission of data from a transmitter to receiver. The present invention is directed to improving data transmission. To this end, the transmission of data is accelerated, and an inband-signaling of information is carried out on an MAC-layer plane, wherein the information is particularly relevant to the base station (BS).

20 Claims, 10 Drawing Sheets

FIG 12

Table 1

| RRC | Signaling Radio Bearer | SRB1 | SRB2 | SRB3 | SRB4 |
|---|---|---|---|---|---|
| RLC | Log. channel type | DCCH | DCCH | DCCH | DCCH |
| | RLC mode | UM | AM | AM | AM |
| | Packet size | 136 bits | 128 bits | 128 bits | 128 bits |
| | Priority of logical channel | 1 | 2 | 3 | 4 |
| MAC | Multiplexing | Mulitplexing of 4 log. channels | | | |
| Phys. layer | Transport channel type | DCH | | | |
| | Transport block size | 148 bits | | | |
| | Transport format set (TFS) | TF0=0x148 bits<br>TF1=1x148 bits | | | |
| | TTI | 40 ms | | | |
| | Coding type | Rate 1/3 convolutional coding | | | |
| | CRC length | 16 bits | | | |

FIG 13

Table 2

| RRC | Radio Bearer | RB1 | RB2 |
|---|---|---|---|
| RLC | Log. channel type | DTCH | DTCH |
| | RLC mode | AM | AM |
| | Packet size | 320 bits | 320 bits |
| | Priority of logical channel | 1 | 1 |
| MAC | Multiplexing | Mulitplexing of 2 log. channels ||
| Phys | Transport channel type | DCH ||
| | Transport block size | 340 bits ||
| | Transport format set (TFS) | TF0=0x340 bits<br>TF1=1x340 bits<br>TF2=2x340 bits<br>TF3=3x340 bits<br>TF4=4x340 bits ||
| | TTI | 20 ms ||
| | Coding type | Rate 1/3 turbo coding ||
| | CRC length | 16 bits ||

FIG 14

Table 3

| TFCS SIZE | 10 |
|---|---|
| TFC0 | (TF0, TF0) |
| TFC1 | (TF1, TF0) |
| TFC2 | (TF2, TF0) |
| TFC3 | (TF3, TF0) |
| TFC4 | (TF4, TF0) |
| TFC5 | (TF0, TF1) |
| TFC6 | (TF1, TF1) |
| TFC7 | (TF2, TF1) |
| TFC8 | (TF3, TF1) |
| TFC9 | (TF4, TF1) |

FIG 15

Table 4

| RRC | Radio Bearer | RB1 | RB2 |
|---|---|---|---|
| RLC | Log. channel type | DTCH | DTCH |
| | RLC mode | AM | AM |
| | Packet size | 160 bits | 160 bits |
| | Priority of logical channel | 1 | 1 |
| MAC | Multiplexing | Mulitplexing of 2 log. channels ||
| Phys | Transport channel type | DCH ||
| | Transport block size | 182 bits ||
| | Transport format set (TFS) | TF0=0x182 bits<br>TF1=1x182 bits<br>TF2=2x182 bits<br>TF3=4x182 bits<br>TF4=6x182 bits<br>TF5=8x182 bits ||
| | TTI | 20 ms ||
| | Coding type | Rate 1/3 turbo coding ||
| | CRC length | 16 bits ||

FIG 16

Table 5

| TFCS SIZE | 12 |
|---|---|
| TFC0 | (TF0, TF0) |
| TFC1 | (TF1, TF0) |
| TFC2 | (TF2, TF0) |
| TFC3 | (TF3, TF0) |
| TFC4 | (TF4, TF0) |
| TFC5 | (TF5, TF0) |
| TFC6 | (TF0, TF1) |
| TFC7 | (TF1, TF1) |
| TFC8 | (TF2, TF1) |
| TFC9 | (TF3, TF1) |
| TFC10 | (TF4, TF1) |
| TFC11 | (TF5, TF1) |

METHOD FOR THE TRANSMISSION OF DATA FIELD OF TECHNOLOGY

PRIORITY AND CROSS REFERENCE TO RELATED APPLICATION

This application is a continuation of U.S. Ser. No. 10/595,245, PCT filed on Aug. 30, 2004, which is a national stage entry under 35 U.S.C. §371 of International Application No. PCT/EP04/51958, filed Mar. 29, 2006, which claims priority to German application 103 45 220.6 filed Sep. 29, 2003, all of which are incorporated herein in their entirety by reference.

FIELD OF THE INVENTION

The present invention relates generally to transmitting data from a transmitter to a receiver in accordance with the Universal Mobile Telecommunications System (UMTS) standard.

BACKGROUND

The UMTS radio interface is subdivided into three protocol layers: the physical layer as Layer 1, the data link layer including MAC, RLC, BMC, PDCP as Layer 2 and the network layer with RRC as Layer 3. Within the protocol structure of the UMTS air interface, a radio resource control RRC in the radio network control entity RNC is responsible for the control and allocation of radio resources for all user equipment located in a radio cell. Resource management is currently performed on a relatively slow time basis because the corresponding signaling between the user equipment and the RNC is effected via the RRC messages.

An essential task of the MAC-d entity in the MAC layer in the transmitter is, in the transmit case, to map the data applied via the dedicated logical channels above the MAC layer to the dedicated transport channels of the physical layer. In the receiver, the task of the Mac-d is to distribute the data received on the dedicated transport channels to the dedicated logical channels. In the receive case, the MAC-d entity again distributes the data received via the dedicated transport channels to the relevant dedicated logical channels. On the transport channels, the data is transmitted in the form of fixed-length packet units, the so-called transport blocks. With regard to the further standardization and evolution of UMTS within the Third Generation Partnership Project or 3GPP bodies, improvements for fast and efficient data transmission via the dedicated transport channel are needed.

SUMMARY

An object of the present invention is to improve a data transmission method according to the UMTS standard so as to speed up data transmission. According to the invention, a method for inband signaling (at the MAC layer level) of information relevant to the UMTS base station is disclosed. The present invention implements fast and efficient signaling between the user terminal equipment UE and a particular UMTS base station at the MAC layer level. In the MAC layer level it is, therefore, possible according to the invention to differentiate between data transport blocks and signaling transport blocks and to handle them differently, thereby enabling user data and RRC signaling data to be exchanged between user terminal equipment and base station in the normal way. Signaling data additionally relevant to the base Station is only exchanged between user terminal equipment and base station. This speeds up data transmission particularly in the uplink direction, i.e., from user terminal equipment to a network or to the base station as part of a following network.

According to the invention, in an architecture of a corresponding communication system, RRC functionalities in the form of at least one control and/or data processing means are, therefore, moved from the RNC to the base station. Structural conformity with the existing a UMTS standard is also implemented. To this end, in particular, suitable signaling is created by providing appropriate signaling means in the base station and user terminal equipment. In addition, special signaling transport blocks and two different transport block formats are created. Additional features and advantages of the present invention are described in, and will be apparent from, the following Detailed Description, Figures and Tables that follow.

BRIEF DESCRIPTION OF THE FIGURES

FIG. 12 Table 1 lists parameters for the signaling radio bearers.

FIG. 13 Table 2 lists parameters for the radio bearers.

FIG. 14 Table 3 lists the configurations permitted for transport format combinations.

FIG. 15 Table 4 lists the parameters for the radio bearers according to an embodiment of the invention.

FIG. 16 Table 5 lists the configurations permitted for transport format combinations according to an embodiment of the invention.

DETAILED DESCRIPTION

Figure 1:
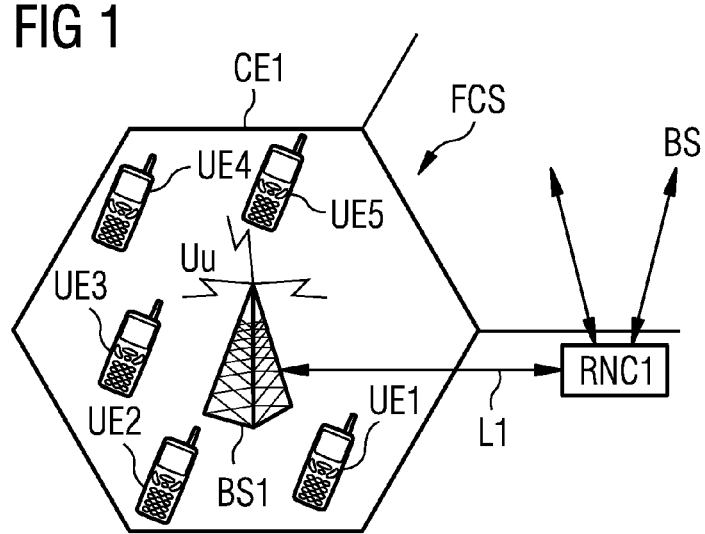
FIG. 1 illustrates components of a radio communication system according to the UMTS standard.

In the Figures and further explanations, the same reference numerals and abbreviations are consistently used for identical parts, functional blocks, layers, and the like. Because of progressive standardization at international level, the technical terms and designations are predominantly borrowed from the Anglo-Saxon language area and should be understood by one of ordinary skill in the art.

A solution is proposed according to the invention in which only base-station-relevant information can be exchanged at MAC layer level between a base station and a user equipment via special signaling transport blocks. A base station according to the invention, therefore, likewise possesses resource management functions, e.g., for reconfiguring the physical channels or for switching the transport channel type. In this regard, new signaling mechanisms between a base station and a user equipment, enabling the base station to perform radio resource management as quickly and efficiently as possible, will also be defined and described below. To facilitate orientation, the basic principles of the network and protocol architecture according to the UMTS standard will first be explained.

FIG. 1 illustrates an example radio communication system FCS operated in accordance with the Universal Mobile Telecommunications System or UMTS standard. In FIG. 1, a radio cell CE1, a base station BS1 and a higher-order radio network control entity RNC1 are disclosed. The base station BS1 is controlled via an associated data line L1 by the higher-order radio network control entity RNC1, which monitors the assignment of radio resources in the radio cell CE1 served by the base station BS1. The base station BS1 is representative of a plurality of other base stations BS (not shown in detail in FIG. 1) of the radio communication system FCS that possess and cover the corresponding radio cells CE. Between the base station BS1 and a radio communication equipment (in this case, one of the mobile telephones UE1-UE5 in the radio cell CE1) message and/or data signals are transmitted over at least one predefined air interface Uu according to a multiple access transmission method.

Figure 2:
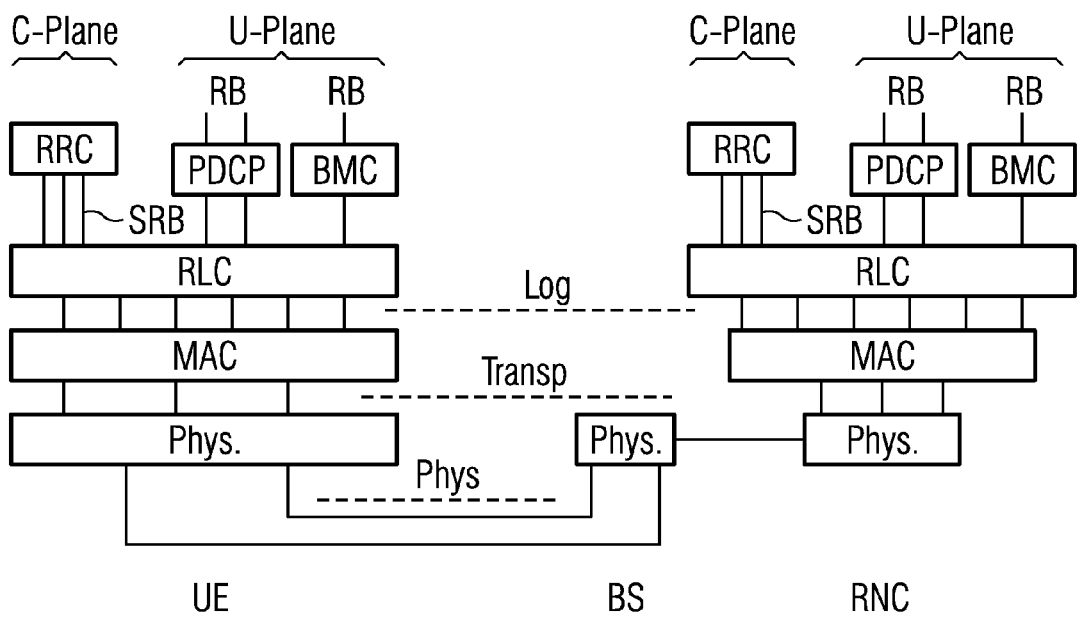
FIG. 2 illustrates a protocol structure of the UMTS air interface.

In UMTS frequency division duplex or FDD mode, for example, separate signal transmission in the uplink and downlink direction is achieved by means of corresponding separate assignment of frequencies or frequency ranges, uplink signifying signal transmission from the user equipment to the relevant base station, and downlink denoting signal transmission from the assigned base station to the user equipment. A plurality of users or more precisely mobile telephones UE1-UE5 in the same radio cell CE1 are preferably separated via orthogonal codes, in particular, according to the so-called code division multiple access or CDMA method. In this example, a number of user equipments UE1, UE2, UE3, UE4 and UE5 are present in the radio cell CE1 of the base station BS1. The UMTS air interface Uu is subdivided into three protocol layers. FIG. 2 illustrates the protocol structure in terms of the dedicated transport channel DCH. The lowest layer is the physical layer, Layer 1. The next higher layer is the data link layer, Layer 2, comprising MAC, RLC, BMC and PDCP. The highest layer is the network layer with the RRC, Layer 3. This architecture is present both in the user equipment UE and in the UMTS network, also known as UMTS Terrestrial Radio Access Network or UTRAN, including the base stations BS and the radio network control entities RNC. Each protocol layer provides its services to the next higher layer via defined service access points.

To make the architecture easier to understand, these service access points are provided with commonly used and unique names such as logical channels, transport channels, radio bearers RB, and signaling radio bearers SRB. The protocol architecture shown in FIG. 2 is not only subdivided horizontally into the abovementioned layers and units, but also vertically into the control plane (C-plane), including the physical layer, MAC, RLC and RRC, and the user plane (U-plane), including the physical layer, MAC, RLC, PDCP and BMC. Only control data required for setting up and maintaining a connection is transmitted via the C-plane, whereas the actual user data is transported via the U-plane. Each protocol layer or protocol entity has particular functions. The protocol architecture is described in detail in [1]. On the network side, the physical layer is in the relevant base station and radio network control entity, whereas the MAC, RLC, PDCP, BMC and RRC are in the radio network control entity only. On the transmitter side, the task of the physical layer Phys is to ensure reliable transmission of the data coming from the MAC layer via the air interface Uu, the data being mapped to the relevant physical channels Phy. The physical layer Phys provides its services to the MAC layer via transport channels which specify how and with which characteristic the data is to be transported over the air interface Uu. The essential functions of the physical layer Phys include channel coding, modulation and CDMA code spreading. Correspondingly, on the receiver side, the physical layer Phys performs CDMA code de-spreading, demodulation and decoding of the received data and then forwards it to the MAC layer for further processing.

The MAC layer provides its services to the RLC layer via logical channels Log that characterize the data type of the transported data. The task of the MAC layer in the transmitter is to map the data present on a logical channel Log above the MAC layer to the transport channels Transp of the physical layer Phys. For this purpose, the physical layer Phys provides the transport channels with different transmission rates. One of the essential functions of the MAC layer in the transmitter is, therefore, to select a suitable transport format TF for each configured transport channel Transp depending on the instantaneous transmission rate, the transmitted power and the data priority of the logical channels Log mapped to that transport channel Transp. For example, a transport format TF specifies how many MAC packet units, known as a transport block, are sent to the physical layer Phys via the transport channel Transp per transmission time interval TTI. In the receiver, the MAC layer distributes the transport blocks received on the transport channels Transp to the logical channels Log. The MAC layer consists of three logical units.

The MAC-d entity handles the user and control data that are mapped to the dedicated transport channels DCH via the corresponding dedicated logical channels DTCH (Dedicated Traffic Channel) and DCCH (Dedicated Control Channel). The MAC-c/sh (MAC-control/shared) entity handles the user and control data of logical channels that are mapped to the common transport channels such as RACH in the uplink or FACH in the downlink. The MAC-b (MAC-broadcast) entity handles only the radio-cell-relevant system information which is broadcast to all the UEs in the relevant radio cell by mapping the logical broadcast control channel BCCH to the transport broadcast channel BCH. The RLC layer provides its services, in the case of RRC, via the signaling radio bearers SRB. In the case of PDCP and BMC, this takes place via the radio bearers RB. The SRB or RB characterize how the RLC layer has to deal with the data packets.

For this purpose, for example, the transmission mode for each configured SRB or RB is defined by the RRC layer: transparent mode TM, unacknowledged mode UM or acknowledged mode AM, the RLC layer being modeled in such a way that there is one independent RLC entity per RB or SRB. In addition, the task of the RLC protocol in the transmitter is to divide or combine the user and signaling data of RBs or SRBs into packets. In the case of the UM and AM transmission modes, the relevant RLC entity stores the copies of the data packets present at an RB or SRB in an RLC transmit buffer until they can be successfully transported over the air interface Uu by the layers below RLC. The RLC layer transfers the data packets resulting from the dividing or combining to the MAC layer for further transportation. The RRC protocol is responsible for setup and cleardown, the reconfiguration of physical channels Phy, transport channels Transp, logical channels Log, signaling radio bearers and radio bearers, as well as negotiation of all the parameters of the Layer 1 and 2 protocols. For this purpose, the RRC entities in the RNC and UE exchange corresponding RRC messages via the SRBs. For RRC layer details, see [2]. The PDCP protocol is only responsible for the transmission of packet-switched (PS) domain data. Its main function is to compress or decompress EP header information. The BMC protocol is used on the network side to transmit so-called cell broadcast messages over the air interface Uu.

Figure 3:
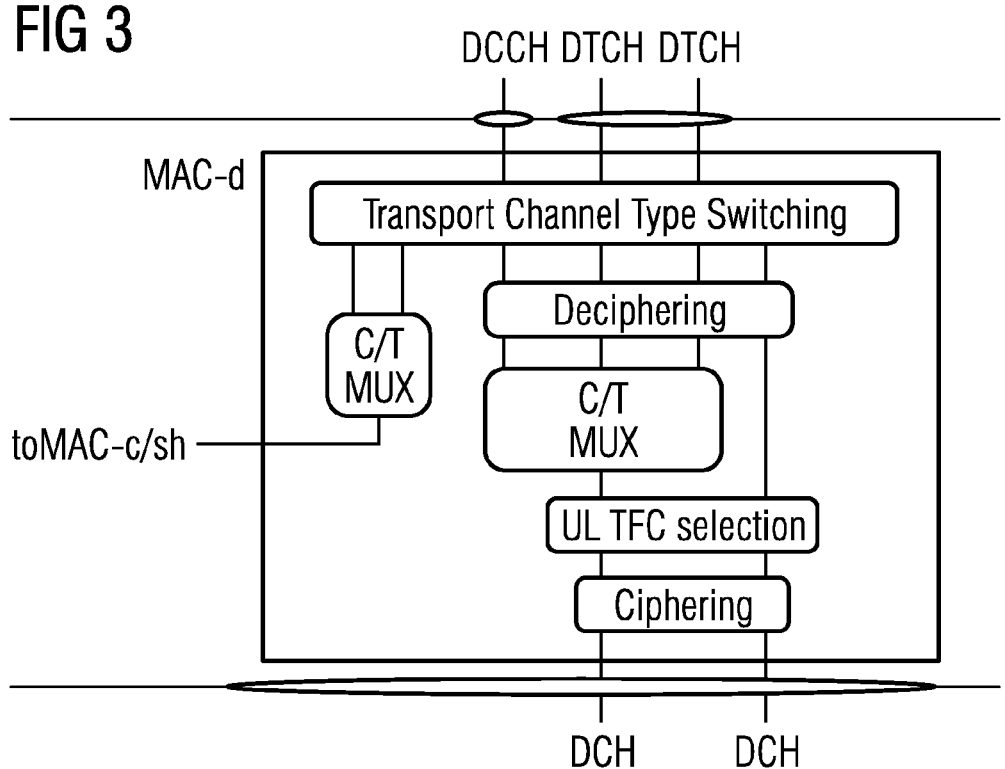
FIG. 3 illustrates an architecture of the MAC-d entity on the UE side.

The functional basics of the MAC-d entity will now be described. The MAC-d entity in the MAC layer handles the user and control data which are mapped via the corresponding dedicated logical channels DTCH (Dedicated Traffic Channel) and DCCH (Dedicated Control Channel) to the dedicated transport channels DCH. The relevant details are described in [3]. By way of example, FIG. 3 shows the architecture of the MAC-d entity on the UE side:

If configured by RRC, the user and control data are mapped by block transport channel type switching from DTCH and DCCH to common transport channels such as RACH, for example, and forwarded to the MAC-c/sh entity for further processing.

C/T MUX is used if multiplexing of a plurality of dedicated logical channels to the same transport channel is performed. In this case, in order to ensure unambiguous identification, the data packets from the relevant logical channels have a 4-bit C/T field added as the MAC header in which the identity of the logical channel is entered. This enables the MAC-d entity on the receiver side to clearly identify the logical channel from which the received data originates.

In the case of RLC transparent mode, TM, the data packets are encrypted (ciphering) in the transmit case or decrypted (deciphering) in the receive case.

The task of the UL TFC selection block is uplink scheduling, i.e. selecting a suitable transport format combination TFC for all the configured DCHs depending on the instantaneous transmission rate, the transmitted power and the data priority of the dedicated logical channels which are mapped to the transport channels.

To facilitate understanding of how the protocols relate to one another, an example will now be explained. For this purpose, a scenario is assumed in which the user equipment UE1 in the radio cell CE1 is using two uplink packet services of 64 kbps each in parallel, e.g., for Internet browsing and streaming of data. The UE1 has been allocated dedicated radio resources by the RRC layer in the RNC1 on the basis of the current traffic situation in the radio cell CE1 and the requested quality of service QoS. In detail, the individual protocol layers or protocol entities have been configured by the RRC layer in the RNC1 for the downlink and uplink in such a way that a particular QoS, such as a certain guaranteed or maximum data rate and/or a defined transmission delay shall be ensured by the Layer 1 and 2 protocols for the duration of the mobile connection. The configuration specified by the RNC1 is then signaled to the RRC layer in the user equipment UE1.

Figure 4:
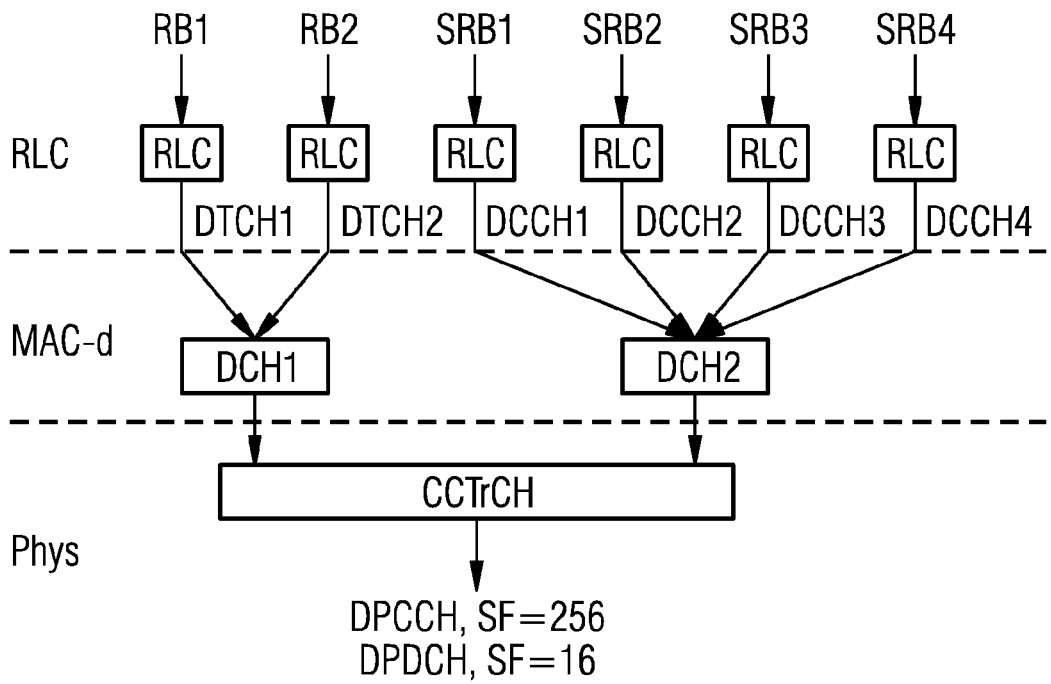
FIG. 4 illustrates an uplink transmission scenario.

FIG. 4 illustrates a typical configuration for the uplink transmission scenario illustrated. In the U-plane, two RBs are specified, i.e., RB1 and RB2, via which the user data of the relevant packet service is transmitted. In the RLC layer, each RB is mapped to an RLC entity and logical traffic channel DTCH. In the C-plane, four 3.4-kbps SRBs SRB1 to SRB4 specified on the basis of the different types of control messages are mapped to an RLC entity and logical control channel DCCH in the RLC layer. In the MAC-d entity, two transport channels DCH1 and DCH2 are configured. The two logical traffic channels DTCH1 and DTCH2 are multiplexed onto the transport channel DCH1 in the U-plane and the four logical control channels DCCH1 to DCCH4 are multiplexed onto the transport channel DCH2 in the C-plane. In the physical layer, the two transport channels are channel-coded and multiplexed onto a coded composite transport channel CCTrCH of 10 ms frame length. Based on FDD radio transmission technology, the data is transmitted over the air interface Uu to UTRAN on the CCTrCH after spreading and modulation via the dedicated physical data channel DPDCH with SF=16. Specific physical layer control information is transmitted on the dedicated physical control Channel DPCCH with spreading factor SF=256 to enable the physical layer in the base station BS1 to also correctly decode the data on the DPDCH after decoding the control information on the DPCCH.

FIGS. 12 to 14, Tables 1 to 3 summarize the configured parameters for the signaling radio bearers, radio bearers and the permitted transport format combinations. For the processing of the data packets in the transmit buffers of the relevant RLC-entities, the logical channels are assigned different priorities from 1 to 8. Priority 1 constitutes the highest and priority 8 constitutes the lowest priority. On the basis of these priorities, the data packets are preferred by the logical channels having a higher priority. In the event of a stalemate situation, i.e., both or a plurality of logical channels on the same transport channel have the same priority, the buffer occupancy BO is taken into account as a further criterion. If, in the case of equal priority of, e.g., two logical channels on the same transport channel, the buffer status of logical channel 1 is higher than that of logical channel 2, the data is first processed by channel 1.

For the transport channel DCH1, five transport formats TF0 to TF4 in the transport format set TFS are configured. For example, the transport format TF2 specifies that, in each transmission time interval TTI of 20 ms, two transport blocks TB of size 340 bits are transmitted via the DCH1 to the physical layer where 16 CRC checksum bits are added to each transport block for error detection. The two transport blocks are then jointly channel-coded by a rate 1/3 turbo coder in order to protect them from transmission errors that may be caused by the transmission channel. For the transport channel DCH2, on the other hand, only two transport formats TF0 and TF1 in the transport format set TFS are configured. Thus, the transport format TF1 specifies that, in each transmission time interval TTI=40 ms, one transport block of size 148 bits is transmitted via the DCH2 to the physical layer where 16 CRC checksum bits are added to the transport block for error detection. The transport block is then channel-coded by a rate 1/3 convolutional coder.

The coded data of the two transport channels are then jointly multiplexed onto a CCTrCH frame depending on their respective TTIs. On the basis of TTI=20 ms, the data from DCH1 is transmitted over the air interface to UTRAN in two consecutive frames, whereas the data from DCH2, on the basis of TTI=40 ms, is transmitted in four consecutive frames. The permissible combination of transport formats of the two transport channels DCH1 and DCH2 on the CCTrCH is specified by the transport format combination set TFCS. The maximum number of possible transport format combinations TFC is the product of the number of transport formats configured for each transport channel. It lies within the responsibility and control of UTRAN to correctly specify the size of the TFCS, i.e., the number and type of the permitted combinations of transport formats of different transport channels. In practice, the permitted number of TFCs in a TFCS is less than the theoretically possible maximum. In this embodiment, the permitted size of the TFCS=10 is also the actual maximum number, also 5 TFs from DCH1 and 2 TFs from DCH2. These 10 permitted transport format combinations are listed in FIG. 14 Table 3. The notation of the TFCs is defined with i=0 . . . 4 and j=0.1 for TF#i from DCH1, TF#j from DCH2.

Figure 5:
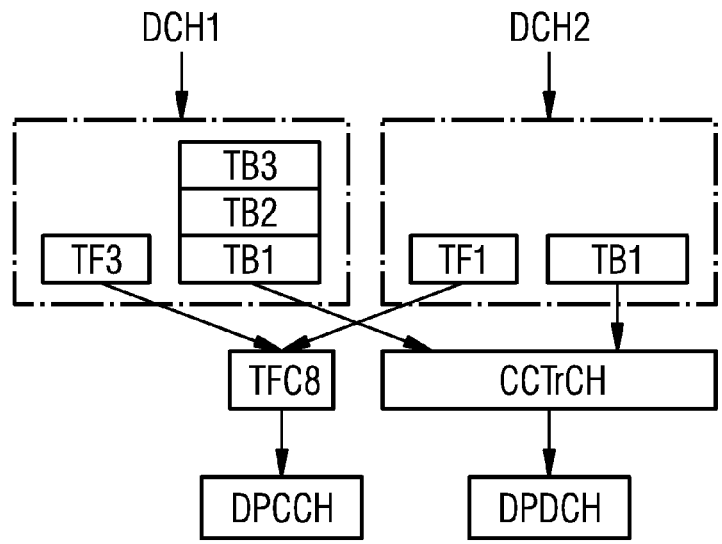
FIG. 5 illustrates mapping of data from transport channels to the physical channels.

FIG. 5 illustrates an example of uplink scheduling in which the MAC-d entity has selected the transport format combination TFC8 for data transmission as a function of the instantaneous transmission situation, the combination TFC8=(TF3, TF1) specifying that the relevant portions of the coded data of three transport blocks TB1, TB2, TB3 from DCH1 (=TF3) and of one transport block (TB1) from DCH2 (=TF1) are transmitted on the CCTrCH. To ensure that the physical layer in the base station BS1 can correctly decode the data on the DPDCH, the transport format combination TFC8 used on the CCTrCH is signaled on the DPCCH as control information. An essential aspect of the present invention is the definition of special signaling transport blocks STB for inband signaling of base-station-relevant information at the MAC layer level. This allows fast and efficient control of radio resources. Without limiting generality, it will now be assumed that the base station BS possesses the following RRC functions:

Reconfiguration of physical channels in the uplink and downlink

Figure 6:
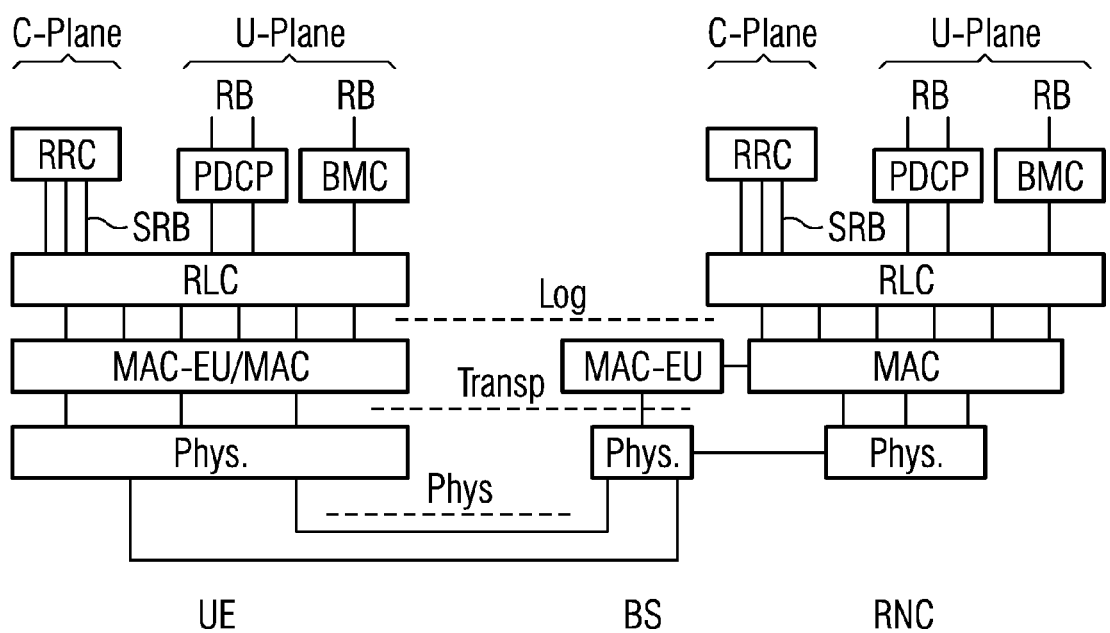
FIG. 6 illustrates an extended protocol structure of the UMTS air interface.

Reconfiguration of the transport formats and transport format combinations in the uplink and downlink Switching of the transport channel type, i.e. from common transport channels to dedicated transport channels and vice versa Setting of the uplink $SIR_{target}$ for fast performance control of dedicated physical channels Specifically, a solution according to the invention looks as follows:

1. Extended UTRAN Protocol Architecture:

Within the UTRAN protocol architecture, a new entity with the designation Medium Access Control Enhanced Uplink, abbreviated to MAC-EU, is defined in the MAC layer. A correspondingly extended UTRAN protocol architecture is shown in FIG. 6 analogously to the depiction in FIG. 2. On the network side the MAC-EU entity is only in the base station, the MAC-EU performing all the functions required for inband signaling of base-station-relevant information concerning the signaling transport blocks for radio resource control. These functions include:

Generating one or more signaling transport blocks for inband signaling;

Selecting a transport channel for transmitting the signaling transport blocks;

Multiplexing signaling transport blocks within the transport blocks of a transport channel that are to be transmitted;

Demultiplexing signaling transport blocks within the received transport blocks of a transport channel;

Forwarding the information transmitted in the signaling transport blocks to the RRC entity in the base station or UE for further processing and Checking for reliable transmission or reception of messages in signaling transport blocks.

Depending on the RRC functionality of the base station BS, various types of messages are exchanged between the base station BS and a user equipment UE via an STB. This new transport block typically contains, according to the following non-exhaustive list:

Physical Channel Reconfiguration Control: message from the base station to the UE to reconfigure the physical channels in the uplink and downlink.

TF Reconfiguration Control: message from the base station to the UE to reconfigure the transport format and transport format combinations in the uplink and downlink.

Buffer Status Control: message from the base station to the UE to transmit the current data volume of a particular transport channel, i.e. the RLC buffer status of all the RBs or logical channels which are multiplexed into the transport channel.

Buffer Status Report: reply from the UE to the base station in response to the buffer status control message with signaling of the data volume of the transport channel.

Figure 7A:
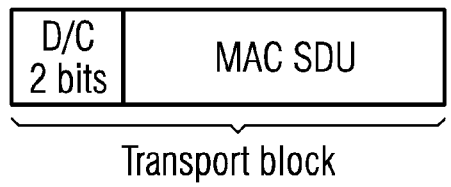
FIG. 7 illustrates transport block formats.
Figure 7B:
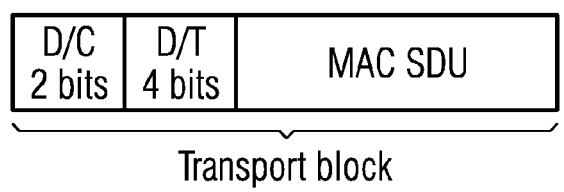

2. Definition of Transport Block Types:

Two new transport block formats are defined for the dedicated logical channels DTCH and DCCH depending on the MAC-multiplexing, see FIG. 7. Without limiting generality, a DCH transport channel is considered in FIG. 7, i.e., in principle the new formats can also be used for the common transport channels such as RACH in the uplink and FACH in the downlink:

Case a): DTCH or DCCH are mapped to a DCH transport channel without multiplexing. In this case only a 2-bit D/C field is added as a MAC header.

Case b): DTCH or DCCH are mapped to a DCH transport channel with multiplexing. In this case the MAC header consists of the 2-bit D/C field and the 4-bit C/T field in which the relevant identity of the logical channel is transmitted.

The field is designated D/C as an abbreviation for Data/Control. The D/C field indicates the transport block type:

With D/C=00 a signaling transport block STB is signaled. The MAC SDU then constitutes the packet unit via which only base-station-relevant information for radio resource control is exchanged between user equipment and base station.

Correspondingly, D/C=11 signals a normal transport block by means of which user or RRC signaling data is transmitted, as hitherto. The MAC SDU then constitutes the packet unit which receives the MAC layer via DTCH or DCCH.

Figure 8:
FIG. 8 illustrates an MAC SDU format in the signaling-transport block case.

3. Structure of the Signaling Transport Block:

FIG. 8 shows the general structure of the MAC SDU part of a signaling transport block STB via which n messages can be transmitted:

TN UL: this status field or field transmits an uplink transmission number and is used for tracking the transmission status in the uplink. The field is k bits long.

TN DL: this field transmits a downlink transmission number and is used for tracking the transmission status in the downlink. The field is k bits long.

Poll: this field is used to request from the receiver an acknowledgment of successful transmission of a signaling transport block within a specified time. The field is 1 bit long.

MT: in this field the message type transmitted in the following message part is specified. The field is 1 bit coded.

MP: in this field the message specified by the MT part is transmitted. The field has a variable length of m bits depending on the type of message to be transmitted.

Flag: this field is used to indicate whether or not the field MT, i.e., another message, is transmitted in the following field. The field is 1 bit long.

Pad: this field is used to pad out the unused part in the MAC SDU with so-called dummy bits.

The status fields TN UL, TN DL and Poll are used to check for reliable transmission of messages in a signaling transport block. This is implemented by the following mechanism:

The MAC-EU entity in the UE has an uplink transmission counter Z1 with an integer value range of 0 to N−1, coded with k bits. For each STB transmitted in the uplink direction, the current value of this uplink counter is transmitted in the field TN UL and then incremented by one. The value of the last DL-STB received is additionally transmitted in the field TN DL. When the maximum count has been reached, Z1 is reset to 0 and incremented once again.

Similarly, the MAC-EU entity in the base station has a downlink transmission counter Z2 with an integer value range of 0 to N−1, coded with k bits. For each STB transmitted in the downlink direction, the current value of this downlink counter is transmitted in the field TN DL and then incremented by one. The value of the last UL-STB received is additionally transmitted in the field TN UL. When the maximum count has been reached, Z2 is reset to 0 and incremented once again.

Using the status field Poll, the relevant MAC-EU entities can if necessary request acknowledgment of successful reception of the STB within a specified time from the relevant receiver entities, i.e., by a set poll bit=1.

In the case of error-free transmission conditions, the relevant MAC-EU entities in the receiver receive a sequential numerical order of signaling transport blocks, i.e., any transmission errors are detected by breaks in the sequential numerical order.

To summarize, according to the invention there are defined, within the MAC_protocol layer, special signaling transport blocks via which in future fast and efficient inband signaling for radio resource control between a base station and a user equipment can be implemented, thereby providing the following advantages. The invention supports an extended UTRAN protocol architecture with RRC functionality in the base station, so that radio resources can in future be managed closer to the air interface. In this way, reconfigurations of radio resources in the uplink and downlink can be carried out much more quickly and efficiently for a user equipment as a function of the traffic load in a radio cell. Data transmission in the downlink and particularly in the uplink can be significantly improved in terms of transmission delay and data throughput.

In the examples which follow, the extended UTRAN protocol architecture shown in FIG. 6 with the new MAC-EU entity in the MAC layer will be considered. Without limiting generality, it will be assumed that the base station possesses the following RRC functions, as already stated above:

Reconfiguration of physical channels in the uplink and downlink

Reconfiguration of the transport formats and transport format combinations in the uplink and downlink Switching of the transport channel type, i.e., from common transport channels to dedicated transport channels and vice versa Setting of the uplink $SIR_{target}$ for fast performance control of dedicated physical channels Data transmission between a UE and UTRAN via a dedicated connection with the following configuration is considered:

For uplink and downlink a transmission scenario according to FIG. 4 is considered.

In the U-plane the user data is transmitted on two RBs, i.e., RB#1 and RB#2. The configuration of the two RBs is summarized in FIG. 15_Table 4.

In the C-plane, 4 SRBs (SRB#1 to SRB#4) are configured. Their parameters are summarized in FIG. 12_Table 1.

FIG. 16 Table 5 lists the permitted transport format combinations, a total of 12 combinations now being defined.

A transport block format according to case b) in FIG. 7 is considered, i.e., the MAC header consists of the fields D/C and C/T.

In respect of the format of a signaling transport block according to FIG. 8, the following configuration is considered: fields TN UL, TN DL and MT 3 bits long in each case.

Example 1 of an embodiment: inband signaling in the downlink. The downlink transmission counter Z2 is in the initial state with the value 0 and MAC-EU in the base station has yet to receive a UL-STB from the UE. Because of the current traffic Situation in the radio cell, the base station wants to send two radio resource control messages to the UE via a DL-STB within the existing dedicated data transmission between UE and UTRAN:

Physical Channel Reconfiguration Control for reconfiguring the dedicated physical channels in the uplink and downlink, e.g., new parameters for SF, channelization code and scrambling code.

Buffer Status Control for transmitting the current data volume of the dedicated UL transport channel DCH1.

Based on the downlink scheduling, the MAC-d entity in the RNC has selected TFC9 for data transmission on the CCTrCH, i.e., the relevant portions of the coded data of four transport blocks (TB1, TB2, TB3, TB4) from DCH1 (=TF3) and of one transport block (TB1) from DCH2 (=TF1) are to be transmitted in the physical layer every 10 ms.

Because of the available transmission capacity on DCH1, the MAC-EU in the base station BS selects this transport channel for transmitting its 182-bit signaling transport block. MAC-EU signals the requirement to the MAC-d entity so that only three normal transport blocks are actually transmitted over the DCH1. The MAC-EU now generates an STB with the following configuration:

D/C=00

C/T=dummy bits, as this field has no significance in the case of an STB

TN UL=0

TN DL=0

Poll=0

MT=Physical Channel Reconfiguration Control

MP1=content of the Physical Channel Reconfiguration Control message

Flag-1=1, in Order to indicate that another message follows

MT=Buffer Status Control

MP2=content of the Buffer Status Control message

Flag-2=0, in order to indicate that another message follows

Pad=dummy bits, if required

Figure 9:
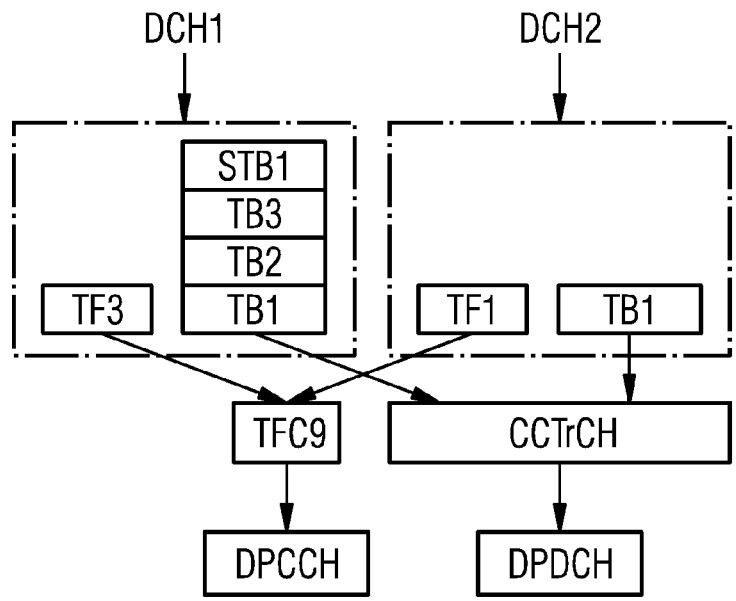
FIG. 9 illustrates inband signaling.
Figure 10:
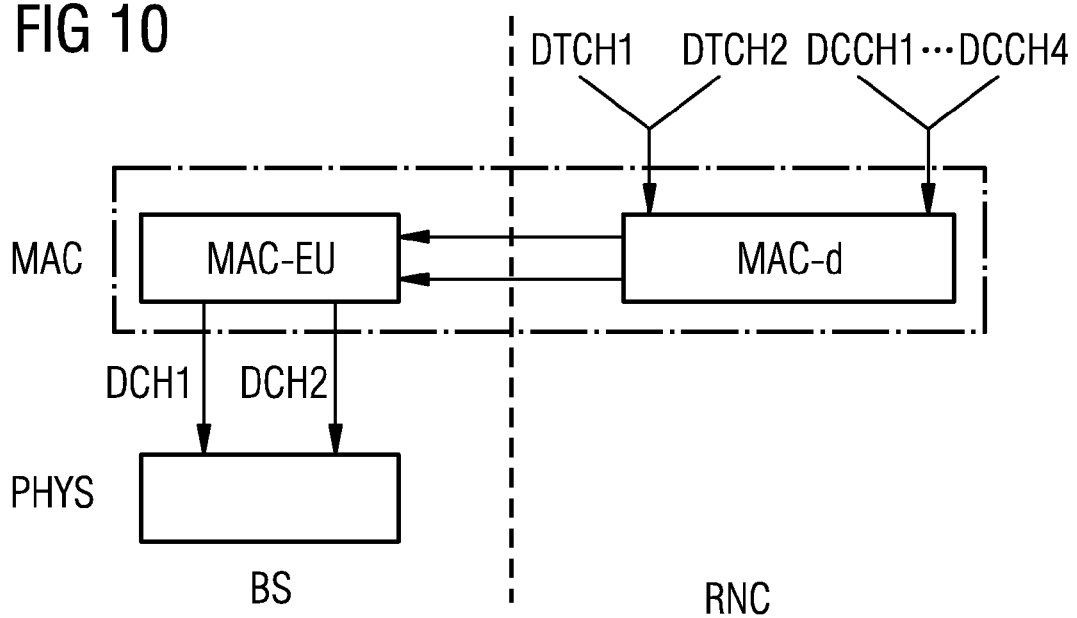
FIG. 10 illustrates a signaling procedure in the MAC layer according to Example 1 in the downlink direction.

This STB is then multiplexed by the MAC-EU within the normal transport blocks of DCH1 to be transmitted, as shown in FIG. 9, and passed on to the physical layer for further processing. The basic signal flow is shown in FIG. 10, the dash-dotted line clearly indicating the physical separation of the MAC layer as a logical entity. In order that the physical layer in the UE can correctly decode the data on the DPDCH, the transport format combination TFC9 used on the CCTrCH is signaled on the DPCCH as control information. In the MAC-EU entity in the UE, the received transport blocks on the DCH1 are evaluated on the basis of the D/C field in the MAC header, and, if D/C=00, the DL-STB1 is demultiplexed accordingly. The three other transport blocks TB 1, TB2 and TB3 are passed on to MAC-d entity for further processing.

Example 2 of an embodiment: inband signaling in the uplink. The uplink transmission counter Z1 is in the initial state with the value 0 and the MAC-EU in the UE has received the DL-STB from the base station. On the basis of the received messages, on the one hand the physical channels in the uplink and downlink are reconfigured while, on the other, measurement of the data volume on the UL-DCH1 is performed. As a response thereto, the Buffer Status Report is now to be sent to the base station via a UL-STB. Based on the uplink scheduling, the MAC-d entity in the UE has selected TFC9 for data transmission on the CCTrCH, i.e., the relevant portions of the coded data of four transport blocks (TB1, TB2, TB3, TB4) from DCH1 (=TF3) and of one transport block (TB1) from DCH2 (=TF1) are to be transmitted in the physical layer every 10 ms.

Figure 11:
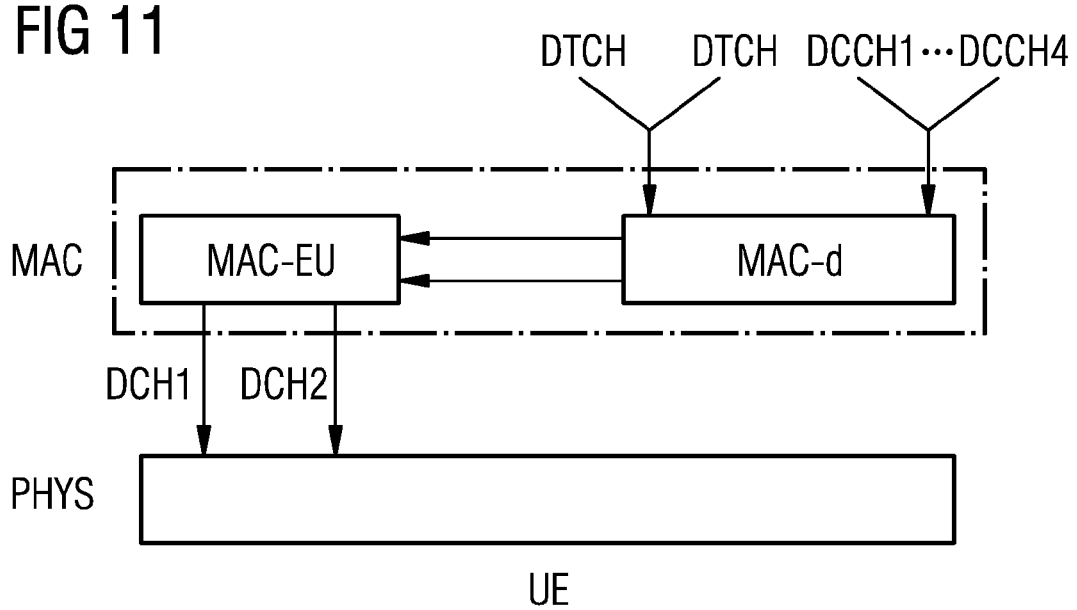
FIG. 11 illustrates a signaling procedure in the MAC layer according to Example 2 in the uplink direction.

Because of the available transmission capacity on DCH1, the MAC-EU selects this transport channel for transmitting its 182-bit signaling transport block. MAC-EU signals the requirement to the MAC-d entity so that only three normal transport blocks are actually transmitted over the DCH1. The MAC-EU now generates an STB with the following configuration:

D/C=00
C/T=dummy bits, as this field has no significance in the case of an STB
TN UL=0
TN DL=0
Poll=0
MT=Buffer Status Report
MP 1=content of the Buffer Status Report message
Flag-1=0, in order to indicate that no other message follows
Pad=dummy bits, if required This STB is then multiplexed by the MAC-EU within the normal transport blocks of DCH1 to be transmitted, as shown in FIG. 9, and passed on to the physical layer for further processing. The basic signal flow in the uplink direction is shown in FIG. 11 where, in contrast to the situation in FIG. 10, there is no physical Separation of the MAC layer. In order that the physical layer in the base station can correctly decode the data on the DPDCH, the transport format combination TFC9 used on the CCTrCH is signaled on the DPCCH as control information. In the MAC-EU entity in the base station, the received transport blocks on the DCH1 are evaluated on the basis of the D/C field in the MAC header, and, if D/C=00, the UL-STB1 is demultiplexed accordingly. The three other transport blocks TB1, TB2 and TB3 are passed on to MAC-d entity in the RNC for further processing.

Within the scope of the description of the present invention, reference is made particularly to the following literature:
3GPP TS 25.301: Radio Interface Protocol Architecture
3GPP TS 25.331: Radio Resource Control (RRC) protocol specification
3GPP TS 25.321: Medium Access Control (MAC) protocol specification
In addition, the following abbreviations are used:
3GPP Third Generation Partnership Project
AM Acknowledged Mode
BCCH Broadcast Control Channel
BCH Broadcast Channel
BMC Broadcast Multicast Control
BO Buffer Occupancy
BS Base Station
CCTrCH Coded Composite Transport Channel
CDMA Code Division Multiple Access
CE Radio cell
CRC Cyclic Redundancy Check
D/C Data/Control
DCCH Dedicated Control Channel
DCH Dedicated Channel
DL Downlink
DPCCH Dedicated Physical Control Channel
DPDCH Dedicated Physical Data Channel
DTCH Dedicated Traffic Channel
FACH Forward Access Channel
FCS Radio communication system
FDD Frequency Division Duplex
IP Internet Protocol
kbps Kilobits per second
Log Logical Channel
MAC Medium Access Control
MAC-b MAC broadcast
MAC-c/sh MAC control/shared
MAC-d MAC dedicated
MAC-EU MAC Enhanced Uplink
MP Message Part
MT Message Type
PDCP Packet Data Convergence Protocol
PS Packet-switched
Phy Physical Channel
Phys Physical layer
QOS Quality of Service
RACH Random Access Channel
RB Radio Bearer
RLC Radio Link Control
RNC Radio Network Controller, radio network control entity
RRC Radio Resource Control
SDU Service Data Unit
SF Spreading Factor
SIR Signal to Interference Ratio
SRB Signaling Radio Bearer
STB Signaling Transport Block
TB Transport Block
TF Transport Format
TFC Transport Format Combination
TFCS Transport Format Combination Set
TFS Transport Format Set
TM Transparent Mode
TN Transmission Number
Transp Transport Channel
TTI Transmission Time Interval
UE User Equipment
UL Uplink
UM Unacknowledged Mode
UMTS Universal Mobile Telecommunications System
UTRAN UMTS Terrestrial Radio Access Network It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for transmitting data from user terminal equipment to a base station, the base station configured to process at least one resource management function, comprising:
performing inband signaling of information relevant to the base station at the MAC layer level between a user terminal equipment and the base station by:
multiplexing the inband signaling information with data of a transport channel that is to be transmitted, wherein the inband signaling information comprises Buffer Status Report information signaling volume of the data of the transport channel from the user terminal equipment to the base station based on at least one radio resource control message received from the base station.

2. The method according to claim 1, wherein the transport channel is a dedicated or common transport channel.

3. The method according to claim 1, further comprising providing an uplink transmission number in the inband signaling information for tracking the transmission status in uplink.

4. The method according to claim 1, further comprising providing a downlink transmission number in the inband signaling information for tracking the transmission status in downlink.

5. The method according to claim 1, further comprising providing a message type in the inband signaling information indicating a type of message to be transmitted.

6. The method according to claim 5, further comprising providing a message part in the inband signaling information having a variable length based on the message type to be transmitted.

7. The method according to claim 1, further comprising providing a Flag in the inband signaling information indicating whether another message is transmitted in the subsequent field.

8. The method according to claim 1, further comprising: providing a Pad in the inband signaling information for padding out unused part in MAC Service Data Unit (MAC SDU) with dummy bits.

9. The method according to claim 1, further comprising exchanging, in the inband signaling information, various radio resource control messages between the base Station (BS) and the user terminal equipment (UE).

10. The method according to claim 1, further comprising transmitting the inband signaling information using CDMA via an air interface.

11. The method according to claim 1, further comprising transmitting the inband signaling information in FDD mode.

12. The method according to claim 1, further comprising transferring the inband signaling information to the physical layer.

13. The method according to claim 1, wherein performing inband signaling of information comprises:
reconfiguring physical channels in uplink and downlink;
reconfiguring transport formats and transport format combinations in uplink and downlink;
switching transport channel type between common transport channels and dedicated transport channels; or
setting uplink $SIR_{target}$ for fast performance control of dedicated physical channels.

14. The method according to claim 1, further comprising selecting a transport channel for transmitting the inband signaling information.

15. The method according to claim 1, further comprising increasing a transmission counter after transmitting the inband signaling information.

16. A user terminal device configured to transmit data to a base station, wherein the base station is configured to process at least one resource management function, the user terminal device configured to:
perform inband signaling of information relevant to the base station at the MAC layer level between a user terminal device and the base station by:
multiplexing the inband signaling information with data of a transport channel that is to be transmitted, wherein the inband signaling information comprises Buffer Status Report information signaling volume of the data of the transport channel from the user terminal device to the base station based on at least one radio resource control message received from the base station.

17. The user terminal device according to claim 16, further configured to transmit the inband signaling information using CDMA via an air interface.

18. The user terminal device according to claim 16, further configured to transmit the inband signaling information in FDD mode.

19. The user terminal device according to claim 16, further configured to transfer the inband signaling information to the physical layer.

20. A base station configured to receive data from a user terminal device, wherein the base station is configured to process at least one resource management function, the base station configured to:
receive inband signaling information relevant to the base station at the MAC layer level from a user terminal device by:
de-multiplexing the inband signaling information from data of a transport channel that is transmitted by the user terminal device, wherein the inband signaling information comprises Buffer Status Report information signaling volume of the data of the transport channel from the user terminal device to the base station based on at least one radio resource control message transmitted by the base station.

* * * * *